US012472439B2

(12) United States Patent
John et al.

(10) Patent No.: US 12,472,439 B2
(45) Date of Patent: Nov. 18, 2025

(54) GAMING SYSTEMS AND METHODS OF DIRECTING USER ACTIVITY ASSOCIATED WITH USER RESOURCES

(71) Applicant: Truist Bank, Charlotte, NC (US)

(72) Inventors: Michael Taylor John, San Francisco, CA (US); Noah Jeffrey Joyce, Atlanta, GA (US)

(73) Assignee: TRUIST BANK, Charlotte, NC (US)

( * ) Notice: Subject to any disclaimer, the term of this patent is extended or adjusted under 35 U.S.C. 154(b) by 242 days.

(21) Appl. No.: 18/466,321

(22) Filed: Sep. 13, 2023

(65) Prior Publication Data

US 2025/0083054 A1 Mar. 13, 2025

(51) Int. Cl.

| | |
|---|---|
| ***A63F 13/79*** | (2014.01) |
| ***A63F 13/533*** | (2014.01) |
| ***A63F 13/73*** | (2014.01) |

(52) U.S. Cl.

CPC ............ *A63F 13/79* (2014.09); *A63F 13/533* (2014.09); *A63F 13/73* (2014.09)

(58) Field of Classification Search

CPC .......... A63F 13/30; A63F 13/40; A63F 13/44; A63F 13/45; A63F 13/50; A63F 13/52; A63F 13/533; A63F 13/58; A63F 13/67; A63F 13/69; A63F 13/70; A63F 13/73; A63F 13/79; A63F 2300/208; A63F 2300/53; A63F 2300/55; A63F 2300/5546; A63F 2300/5593; A63F 2300/60; A63F 2300/63

See application file for complete search history.

(56) References Cited

U.S. PATENT DOCUMENTS

| | | | | |
|---|---|---|---|---|
| 9,623,333 | B2 * | 4/2017 | Pattison | A63F 13/60 |
| 11,305,196 | B1 * | 4/2022 | Gluck | A63F 13/352 |
| 2006/0128460 | A1 | 6/2006 | Muir | |
| 2009/0094535 | A1 * | 4/2009 | Bromenshenkel | A63F 13/67 715/757 |
| 2012/0071218 | A1 * | 3/2012 | Smith | A63F 13/30 463/1 |
| 2012/0315987 | A1 | 12/2012 | Walling | |
| 2013/0291065 | A1 * | 10/2013 | Jakowski | H04L 67/04 726/4 |
| 2014/0038703 | A1 | 2/2014 | Lampert | |
| 2015/0206388 | A1 | 7/2015 | Arnone | |
| 2025/0083054 | A1 | 3/2025 | John | |

* cited by examiner

*Primary Examiner* — Omkar A Deodhar

(74) *Attorney, Agent, or Firm* — Michael A. Springs, Esq.; Shumaker, Loop & Kendrick, LLP; Patrick B. Horne

(57) ABSTRACT

Systems and methods determine that a user has initiated, via a user device, a gaming profile associated with an entity and access an entity data source storing user data corresponding to a user profile of the user, the user data including information about current user resources. Based in part on the current user resources, entity aim(s) associated with the user are derived that would benefit the entity, and gaming action(s) capable of being performed via the user device and associated with the gaming profile that would further the entity aim(s) are determined. Based in part on the entity aim(s), a weighted value is calculated and assigned to each of the gaming action(s). The gaming profile of the user is monitored for completion of the gaming action(s), and remuneration is allocated to the gaming profile in an amount correlated with the weighted value assigned to the completed gaming action(s).

20 Claims, 7 Drawing Sheets

GAMING SYSTEMS AND METHODS OF DIRECTING USER ACTIVITY ASSOCIATED WITH USER RESOURCES

FIELD OF THE INVENTION

This invention relates generally to the field of computer gaming, and more particularly embodiments of the invention relate to computer gaming systems and methods of directing user activity associated with user resources.

BACKGROUND OF THE INVENTION

Users of computer gaming systems participate in games for various reasons such as the intrigue with exploring captivating environments, drive to overcome formidable challenges, feeling a surge of achievement, development of a skill, and/or overall a sense of accomplishment in playing the games. Game developers often design games in a way that will illicit these feelings or provide these opportunities. However, there are opportunities for augmented user experiences that often go unrealized. A need exists for improved gaming systems and methods that provide such opportunities.

BRIEF SUMMARY

Shortcomings of the prior art are overcome and additional advantages are provided through the provision of a gaming system for directing user gaming actions. The gaming system includes at least one processor, a communication interface communicatively coupled to the at least one processor, and a memory device storing executable code that, when executed, causes the at least one processor to, in part, determine that a user has initiated, via a user device, a gaming profile associated with an entity, and access, based on the determining, an entity data source storing user data corresponding to a user profile of the user, wherein the user data comprises information about current user resources. Based at least in part on the current user resources, one or more entity aims associated with the user that would benefit the entity are derived, and one or more gaming actions capable of being performed via the user device and associated with the gaming profile that would further the one or more entity aims are determined. Based at least in part on the one or more entity aims, a weighted value is calculated and assigned to each gaming action of the one or more gaming actions, and the gaming profile of the user is monitored for completion of the one or more gaming actions. Further, remuneration is allocated to the gaming profile in an amount correlated with the weighted value assigned to the completed one or more gaming actions.

In some embodiments, at least one of the one or more entity aims is selected from the group consisting of increasing user savings, increasing user engagement, promoting cross-selling with partner entities, promoting fiscal learning, borrowing facility initiation, and increasing user retention.

In some embodiments, the remuneration comprises an in-game resource that is capable of being exchanged for gameplay access associated with the gaming profile that enables participation in an application game. Further, in some embodiments, the application game supplements the current user resources upon meeting game criteria, wherein the current user resources comprise a real-world resource.

In some embodiments, the allocating the gaming profile remuneration is based upon completion of an undisclosed number of actions of the one or more gaming actions.

In some embodiments, the code, when executed, further causes the processor to: track the user's progress towards the one or more entity aims by receiving data from a gaming software application running on the user device; initiate displaying, via a user interface of the gaming software application, the gaming software application being accessible via the user device, the user's progress towards the one or more entity aims; transmit one or more control signals to the user device to cause the gaming software application running on the user device to provide a daily game, the daily game allocating the remuneration upon the user's reaching of a threshold within the daily game; receive engagement data from the user device corresponding to the user's engagement with the daily game; record instances of user engagement with the daily game; and determine from the recorded instances that the user engaged with the daily game, wherein a predefined remuneration amount is associated with each of the instances, and based on the user engaging with the game on consecutive days, increasing the amount of the remuneration allocated relative the predefined remuneration amount.

In some embodiments, the deriving of the one or more entity aims comprises: collecting entity data from a plurality of user profiles; separating the entity data into disparate aspects of the entity's business; iteratively analyzing the entity data of each of the disparate aspects of the entity's business; ranking, in order of value to the entity, each of the disparate aspects of the entity's business; and designating one or more of the disparate aspects of the entity's business as the one or more entity aims according to the value.

In some embodiments, the initiating the gaming profile comprises an authentication process, wherein the authentication process comprises verifying authentication data obtained from the user with stored authentication information in order for the user to access the gaming profile.

Additionally, disclosed herein is a computer system for directing user activity via a software application. The system includes at least one processor, a communication interface communicatively coupled to the at least one processor, and a memory device storing executable code that, when executed, causes the at least one processor to, in part, authenticate authentication information provided, via a user device, by a user in order to access a user profile of the software application, wherein the software application is associated with an entity. One or more entity aims associated with the user that would benefit the entity are derived, and one or more actions capable of being performed via the software application that would further the one or more entity aims are determined. Based at least in part on the one or more entity aims, a weighted value is calculated and assigned to each action of the one or more actions. The user profile is monitored for the completion of one or more actions, and a remuneration is allocated to the user profile in an amount correlated with the weighted value assigned to the completed one or more actions.

In some embodiments, at least one of the one or more entity aims is selected from the group consisting of increasing user savings, increasing user engagement, promoting cross-selling with partner entities, promoting fiscal learning, borrowing facility initiation, and increasing user retention.

In some embodiments, the software application comprises a game and the remuneration comprises an in-game resource that is exchanged for gameplay access associated with the user profile that enables participation in the game.

In some embodiments, the allocating the remuneration is based upon completion of an undisclosed number of actions of the one or more actions.

In some embodiments, the code when executed further causes the processor to: track the user's progress towards the one or more entity aims by receiving data from the software application running on the user device; initiate displaying, via a user interface of the software application accessible via the user device, the user's progress towards the one or more entity aims; transmit one or more control signals to the user device to cause the software application running on the user device to provide a daily game, the daily game allocating the remuneration upon the user's reaching of a threshold within the daily game; receive engagement data from the user device corresponding to the user's engagement with the daily game; record instances of user engagement with the daily game; and determine from the recorded instances that the user engaged with the daily game, wherein a predefined remuneration amount is associated with each of the instances, and based on the user engaging with the game on consecutive days, increasing the amount of the remuneration allocated relative the predefined remuneration amount.

In some embodiments, the deriving of the one or more entity aims comprises: collecting entity data from a plurality of user profiles; separating the entity data into disparate aspects of the entity's business; iteratively analyzing the entity data of each disparate aspect of the entity's business; ranking, in order of value to the entity, each disparate aspect of the entity's business; and designating one or more disparate aspects of the entity's business operations as the one or more entity aims according to the ranking.

Also disclosed herein is a computer-implemented method of directing user activity via a software application. The computer-implemented method includes, in part, determining that a user has initiated, via a user device, a gaming profile of the gaming software application associated with an entity and based thereon accessing an entity data source storing user data corresponding to a user profile of the user, where the user data includes information about current user resources. Based at least in part on the current user resource, one or more entity aims associated with the user that would benefit the entity are derived. Further, one or more gaming actions capable of being performed via the user device and associated with the gaming profile that would further the one or more entity aims are determined. The method also includes calculating and assigning, based at least in part on the one or more entity aims, a weighted value to each gaming action of the one or more gaming actions. The gaming profile of the user is monitored for completion of the one or more gaming actions, and the method allocates to the gaming profile remuneration in an amount correlated with the weighted value assigned to the completed one or more gaming actions.

In some embodiments, at least one of the one or more entity aims is selected from the group consisting of increasing user savings, increasing user engagement, promoting cross-selling with partner entities, promoting fiscal learning, borrowing facility initiation, and increasing user retention.

In some embodiments, the remuneration comprises an in-game resource that is capable of being exchanged for gameplay access associated with the gaming profile that enables participation in a game of the gaming software application. Further, in some embodiments, the game supplements the current user resources upon meeting game criteria, wherein the current user resources comprise a real-world resource.

In some embodiments, the method further includes tracking the user's progress towards the one or more entity aims by receiving data from the gaming software application running on the user device; initiating displaying, via a user interface of the gaming software application accessible via the user device, the user's progress towards the one or more entity aims; transmitting one or more control signals to the user device to cause the gaming software application running on the user device to provide a daily game, the daily game allocating the remuneration upon the user's reaching of a threshold within the daily game; receiving engagement data from the user device corresponding to the user's engagement with the daily game; and determining from the recorded instances that the user engaged with the daily game, wherein a predefined remuneration amount is associated with each of the instances, and based on the user engaging with the game on consecutive days, increasing the amount of the remuneration allocated relative the predefined remuneration amount.

In some embodiments, the deriving of the one or more entity aims comprises: collecting entity data from a plurality of user profiles; separating the entity data into disparate aspects of the entity's business; iteratively analyzing the entity data of each of the disparate aspects of the entity's business; ranking, in order of value to the entity, each of the disparate aspects of the entity's business; and designating one or more of the disparate aspects of the entity's business as the one or more entity aims according to the value.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
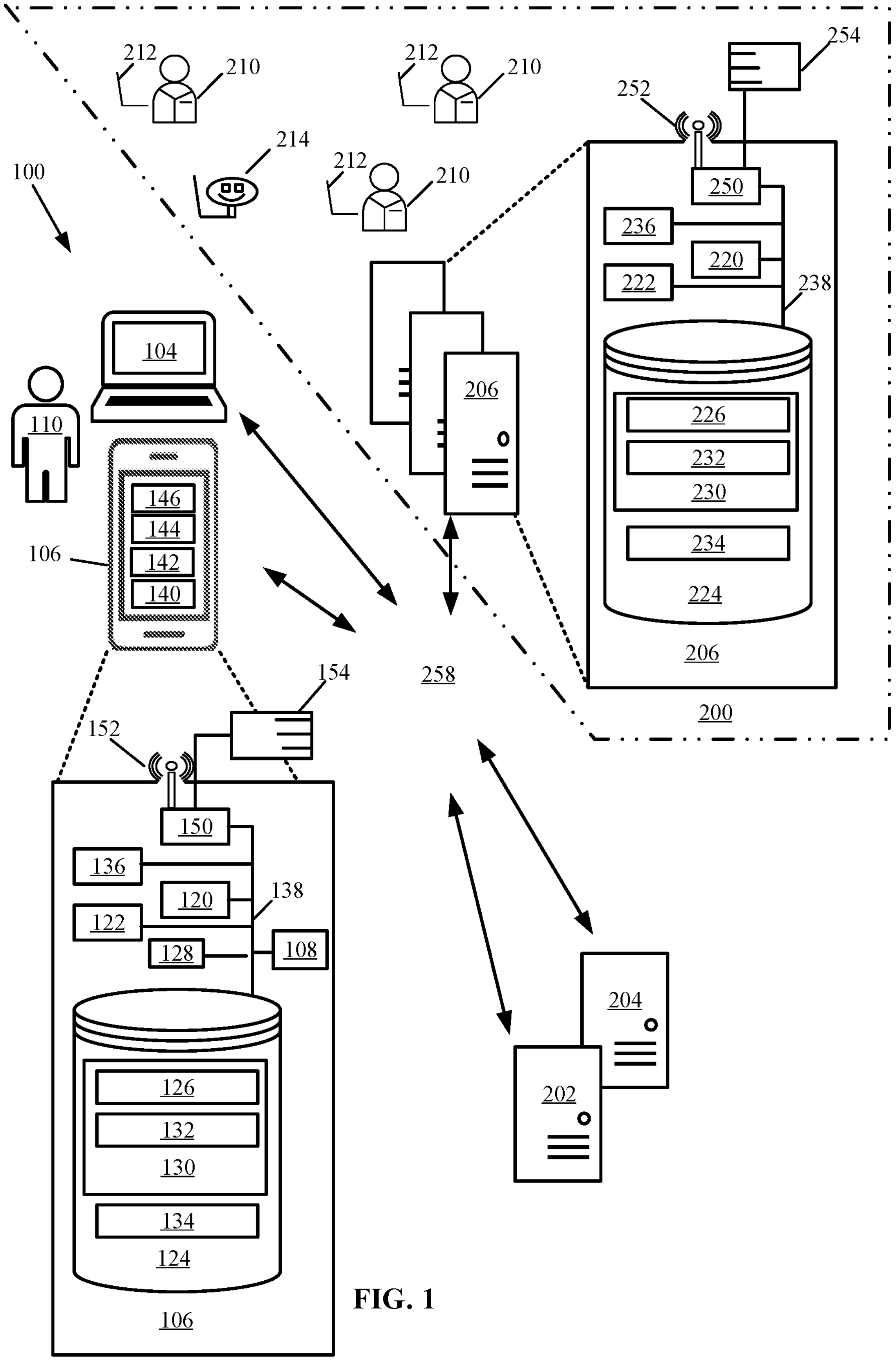
FIG. 1 illustrates a computing environment that includes a computer gaming system for directing user activity associated with user resources, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements. Furthermore, a device or structure that is configured in a certain way is configured in at least that way, but may also be configured in ways that are not listed.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise (e.g., company, organization, institution, business, university, etc.) that hosts, maintains, or uses computer systems that provide functionality for the disclosed systems and methods. In particular, the term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes a computer system for directing user activity associated with user resources, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device 104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processor 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processor 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications that comprise computer-executable program instructions or code executed by the processing device 120 to implement, via the user device 104, 106, the functions described herein. For example, the memory device 122 may store applications and/or association data related to a conventional web browser application and/or an enterprise-distributed application (e.g., a mobile application). These applications also typically provide a graphical user interface (GUI) that is displayed via the display 140 that allows the user 110 to perform functions via the application including to communicate, via the user device 104, 106 with the enterprise system 200, and/or other devices or systems. The GUI on the display 140 may include features for displaying information and accepting inputs from users, and may include input controls such as fillable text boxes, data fields, hyperlinks, pull down menus, check boxes, and the like.

In various embodiments, the user 110 may download, sign into, or otherwise access the application from an enterprise system 200 or from a distinct application server. In other embodiments, the user 110 interacts with the enterprise system 200 via a web browser application in addition to, or instead of, the downloadable version of the application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of “service(s)” or “product(s)” thus relates to either or both in these descriptions. With regard, for example, to online information and financial services, “service” and “product” are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with a gaming functionality and/or application. In particular, the enterprise system 200 may include an enterprise mobile software application that includes a gaming functionality that may be installed on or otherwise accessed by the user device 104, 106. When the user 110 accesses the gaming functionality, the user 110 may be rewarded by performing various tasks. In particular, the user 110 may receive rewards for accomplishing various goals related to financial wellness. The gaming functionality may help the user develop smart financial habits with monetary rewards for developing these habits and is rooted in behavioral economics.

In general, the gaming application disclosed herein may operate via external systems 202, 204 and provides front-end functionalities that enable the user 110 to interact with games. In particular, the external systems 202, 204 may host the game server(s). In one embodiment, the external systems 202, 204 include Amazon Web Services (AWS), which provides a workflow for developing, deploying, and hosting the gaming application. Further, the games may incorporate user/customer profiles that may be linked to that specific user's/customer's profile that is stored within or otherwise associated with the enterprise system 200. By syncing the user/customer profile for the gaming application with the user/customer profile of the enterprise system 200, the gaming application can access information about the user 110 that is derived from the user/customer profile of the enterprise system 200. This enables the gaming application to utilize user/customer data in order to personalize the game in accordance with various enterprise objectives. In a non-limiting example, user/customer data stored by the enterprise system 200 that indicates current account balances may be accessed by the game server(s) of the external system 202, 204 in order to personalize the gaming experience for the user 110 by encouraging certain financial behaviors. Other external system 202, 204 may include promotional prize server(s) that can be configured to generate one or more random numeric outcomes based on one or more rules defining a win likelihood.

To perform various functionalities associated with the gaming application, the game server(s) may be configured to make an API call to the prize server(s) to provide information necessary to generate a random numeric outcome. For instance, the API call may indicate a current game at a current level, and the prize server(s) process the information provided to generate a random number based on that information in accordance with various rules defining a win likelihood. The prize server(s) then provide results from the random number generator, which is used to determine a monetary reward in response to the actions performed by the user 110. In addition, the monetary rewards obtained as a result of performing various actions via the gaming application may be transferred to user/customer accounts identified by the user/customer profile of the enterprise.

Figure 2:
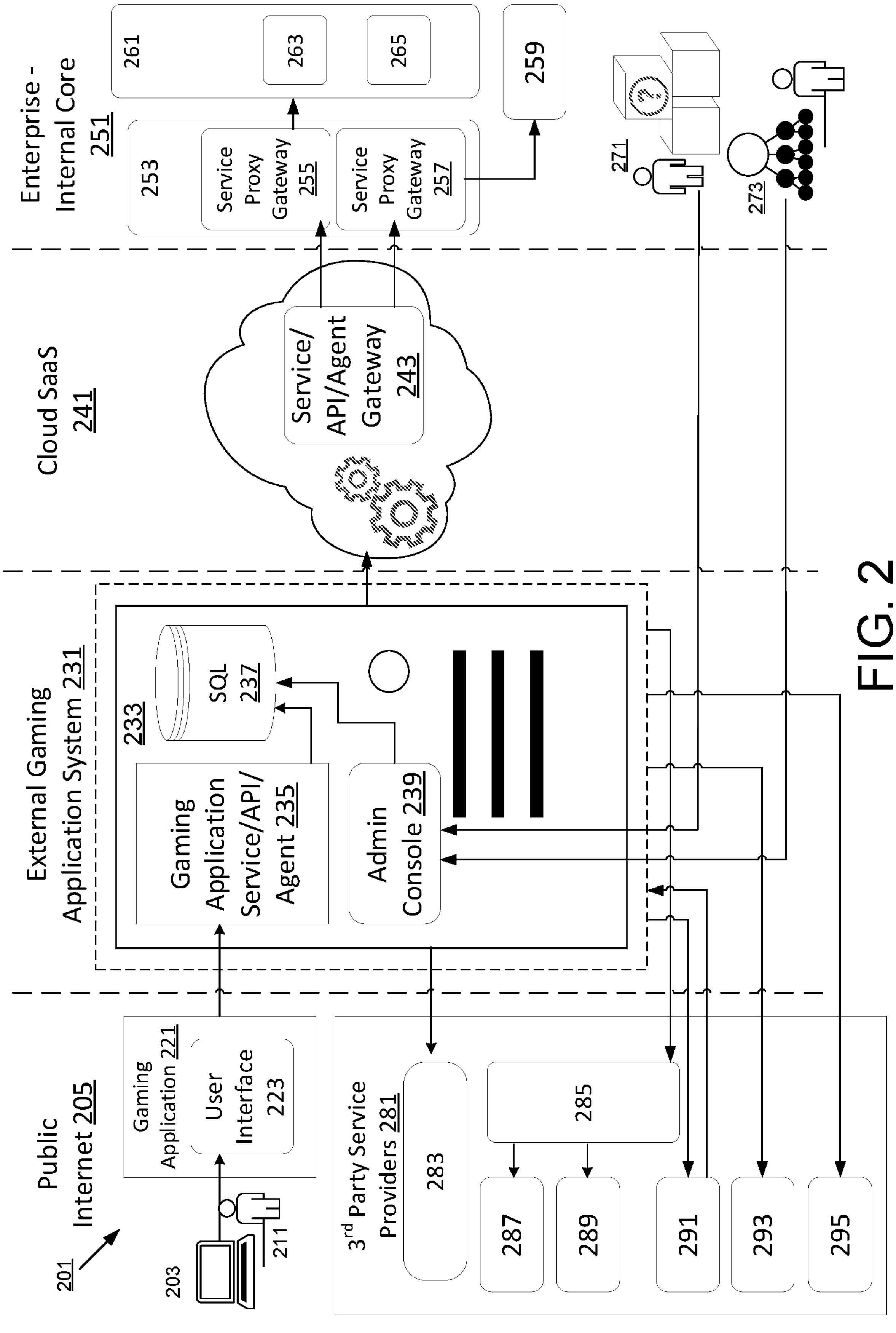
FIG. 2 depicts an example flow diagram for network communication associated with a gaming application, in accordance with an embodiment of the present invention.

FIG. 2 depicts an example flow diagram 201 for network communication associated with an external gaming application system 231, in accordance with an embodiment of the present invention. In particular, the flow diagram 201 depicts a user 211 providing one or more inputs, via a user device 203, to access the gaming application 221 across a public network 205 (e.g., public internet). The gaming application 221 includes a user interface 223 through which the user 211 interacts in order to play electronic game(s) (i.e., video game(s)). The game(s) may be played when the user 211 interacts via the user interface 223 and/or through other input device(s) (e.g., a joystick, controller, keyboard, motion sensing device, etc.). Inputs provided by the user 211 may generate visual feedback through a display of the user device 203.

The gaming application 221 is configured to communicate with an external gaming application system 231 that include server(s) 233 that are used to host the gaming application 221. Example cloud-based sever(s) 233 include, for example, AWS. The cloud-based server(s) 233 that host the gaming application 221 include the gaming application service/API/agent 235 that receives an API call from the gaming application 221. The API call utilizes a uniform resource identifier (URI), such as a URL, that identifies the cloud-based server(s) 233, incorporates the application layer protocol (e.g., the HTTP method) indicating the desired action to be performed by the service/API/agent 235 (e.g., the data to be extracted, the functionality to be performed, etc.), includes a header so that the service/API/agent 235 understands the request, and includes an API key or access token used by the service/API/agent 235 to authenticate the API call. The service/API/agent 235 accesses data from the relational database 237 (e.g., SQL database), which may include a collection of structured data needed for the gaming application 221 to integrate various features. The admin console 239 is used by support and developers to provide administrative functions (e.g., provide support for customers, check on the health of the external gaming application system, etc.).

The external gaming application system is integrated with a cloud SaaS 241, which is configured to receive API calls from the cloud-based server(s) 233 to access user data associated with a user profile of the user 211. In a non-limiting example, the user data includes information associated with financial services and products offered by the enterprise such as direct deposit information, current financial balance information, financial savings information, financial transaction history, etc.). The cloud SaaS 241 includes a service/API/agent gateway 243, which acts an edge gateway or network entry point for the enterprise-internal core system 251. The service/API/agent gateway 243 may provide, according to one embodiment, network translation between networks that use different protocols and may include routers, routing switches, multiplexers, etc. In one particular embodiment, the service/API/agent gateway 243 includes various permissions to perform calls to fetch the user data.

Retrieval of user data within the enterprise-internal core system 251 is facilitated by use of service proxy gateway(s) 255, 257 of the gateway platform 253. The gateway platform 253 is a multichannel API gateway configured to provide security, control, integration and optimized access to fetch user data. The service proxy gateway(s) 255, 257 are modules that receive the API requests and forward them to defined endpoints within the internal enterprise system 261. In particular, the service proxy gateway(s) 255, 257 facilitate load balancing, access filtering, caching, etc. The internal enterprise system 261 includes an API-powered business ecosystem that enables the enterprise to perform various backend services and business functionalities. The internal enterprise system 261 includes service/API/agent systems 263, 265 that can be used to access the user data from original data sources and used to facilitate payments from a holding account of the cloud-based server(s) 233 so that the financial payments can be transferred to deposit account(s) associated with the user profile of the user 211. According to various embodiments, the financial payments may be made according to a predefined schedule and/or in response to a request from the user 211. The enterprise-internal core system 251 also includes a digital identity and authentication system 259 that is used to authenticate the user 211 and link the user's gaming profile/account to their user profile associated with the enterprise. The enterprise-internal core system 251 is also used by support agents 271 to provide customer support, resolve customer inquiries, etc. Further, the enterprise-internal core system 251 is used by administrators 273 to provide administrative functions for the external gaming application system 231.

Various third-party service providers 281 are also integrated with the external gaming application system 231. One example third-party service provider includes a game operator system 283 that includes promotional prize server(s) that can be configured to generate one or more random numeric outcomes based on one or more rules defining a win likelihood. A communication provider 285 may provide digital communications such as electronic messages through a communications platform 287 and push notifications through an operating system 289. A marketing analysis platform 291 may be used to analyze the efficacy of various messaging and communications associated with the gaming application system 231 and can provide feedback that can be used by the gaming application system 231 to modify functionalities to align with enterprise objectives. For example, the marketing analysis platform 291 may be used for inbound marketing channel attribution and outbound marketing channel attribution so that the enterprise may determine how marketing tactics influence customer interactions. A monitoring system provider 293 may provide off-duty support to detect problems with the gaming application system 231 by using real-time monitoring. When a problem is detected, the monitoring system provider 293 distributes an alert so that the problem can be resolved. An analytics provider 295 may analyze ways in which users interact with the gaming application system 231 in order to perform user experience analysis. Various additional or alternative third-party service providers 281 may also be utilized according to various embodiments.

In other embodiments, the external gaming application 231 is not external to the enterprise internal core 251. Rather, a gaming application may be integrated within the enterprise internal core 251, which advantageously eliminates use of the cloud SaaS 241. In particular, cloud-based server(s) 233 that host the gaming application 221, such as those provided via AWS would still host the gaming application 221, but the application system would be integrated within the enterprise internal core 251. The processes and systems described herein are not limited to the example flow diagram 201, and various other network flow communications may alternatively be implemented that would facilitate access to the gaming application 221.

Although not depicted by the workflow of flow diagram 201, in other embodiments, the user device 203 may be used to access an enterprise application rather than the gaming application 221, in which case the enterprise application is configured to communicate with the enterprise internal core 251 via service/API/agent systems 263, 265. In this embodiment, when the user 211 provides inputs via the enterprise application, which is received via service/API/agent systems 263, 265, the enterprise internal core 251 utilizes the service/API/agent gateway 243 of the cloud SaaS 241 to communicate with the external gaming application system 231. For instance, this embodiment may be used to determine whether a user profile of the user 211 that is associated with the enterprise internal core 251 is integrated with a second user profile of a the external gaming application system 231.

According to various embodiments, the computer system determines that a user has initiated, via a user device, a gaming profile associated with an entity through any type of access to the gaming profile, which includes creating a new gaming account or signing in to an existing account. In some embodiments, this initiation process includes authenticating authentication information provided, via the user device. This authentication process includes verifying that the authentication information that is received matches stored credentials of the user from a database of authorized users. The authentication process can utilize encrypted authentication information that the computer system decrypts, and the decryption process transforms encrypted information into its original format. Also, the process of encryption transforms information from its original format (e.g., the plaintext) to an unreadable format (e.g., ciphertext), and the decryption reconverts the information from its unreadable format back into a readable format.

The disclosed systems and methods provide a specific improvement over prior systems in that the disclosed gaming systems and methods are used to drive consumer behavior towards an entity's objectives or aims. Specifically, the disclosed systems and methods steer user behavior through the use of incentives towards entity objectives/aims. The disclosed systems and methods recite an additional element that reflects an improvement in the functioning to the technical field of computer gaming systems in that the computer gaming systems derive entity aims associated with the user that would benefit the entity, according to one or more criteria, and the computer gaming systems determine gaming actions capable of being performed via the user device that would further the entity aims. Specifically, the computer gaming systems access an entity data source (e.g., a database, memory, etc.) that stores user data corresponding to a user profile of the user, where the user data includes information about current user resources. When that user data is accessed, the computer gaming systems derive entity aims from that user data. Specifically, the computer gaming systems process that user data and identifies aspects of the user data that could be used to further objectives/aims of the entity. This deriving process used to identify aspects of the user data that could be used to further objectives/aims performs an in-depth analysis of the user data to identify objectives/aims that are specific to the user that the user can perform. One example derivation process that could be used to derive the entity aims is, for example, a decision tree hierarchical model. For instance, the decision tree derivation process may incorporate a supervised machine learning categorization process that evaluates probability values in response to relevant input variables obtained from the user data. The derivation process determines and allocates payoffs for each possible outcome and calculates the value of the entity objectives for each chance node in order to determine what user action would provide the most value to the entity. In a non-limiting example, the system may store several overarching objectives/aims specific to the entity, and from those overarching objectives/aims, the computer system identifies objectives/aims that would be relevant to the user.

If, for example, the entity is a financial institution such as a bank, the overarching objectives/aims of the bank may be related to increasing deposits and growing the loan business, with more specific objectives/aims related to increasing user savings, increasing user engagement, promoting cross-selling with partner entities, promoting fiscal learning, borrowing facility initiation, and increasing user retention. The user-specific objectives/aims that are derived would account for many user-specific variables. For example, the derivation process would account for the age and/or proximity to retirement, financial well-being, income level, buying habits, current life situation (e.g., if the customer is paying tuition they are likely to be a student), etc. During the derivation process, the computer system analyzes these variables and predicts what actions the customer/user is most likely to make that would help the financial institution achieve its overarching objectives.

Once the objectives/aims of the entity that are associated with the user that would benefit the entity are derived, the system then determines gaming actions capable of being performed via a user device that would further the entity objectives/aims. This determination of the gaming actions includes formulating incentives that could be associated with the user's gaming profile that would further or otherwise advance the entity's objectives/aims. For example, the one or more gaming actions may include scrolling through and/or reading an informational article on a certain subject, contribute real-world resources such as money to a savings account, 401k, retirement account, emergency fund, etc., repeated visits to the gaming application to drive user engagement, purchase products from partner entities so that the entity receives sponsorship payments, and/or various other gaming actions capable of being performed via the user device and associated with the gaming profile.

When the user initiates the gaming profile to play various games the user's progress towards the one or more entity objectives/aims can be displayed via a user interface of the user device. Specifically, the computer system initiates displaying, via the user interface of the gaming software application, where the gaming software application is accessible via the user device, the user's progress towards the one or more entity aims. The user's progress may be displayed using graphical user interface elements that provide a visual representation of the user's progress. Many visual conventions can be used to represent the user's progress, and these visual conventions can include icons, widgets (e.g., control inputs), tabs, menus, windows, etc. In some embodiments, interface objects (e.g., cursor, pointer, adjustment handle, etc.) can be used by the user via the user interface to interact with the visual representations.

Figure 3:
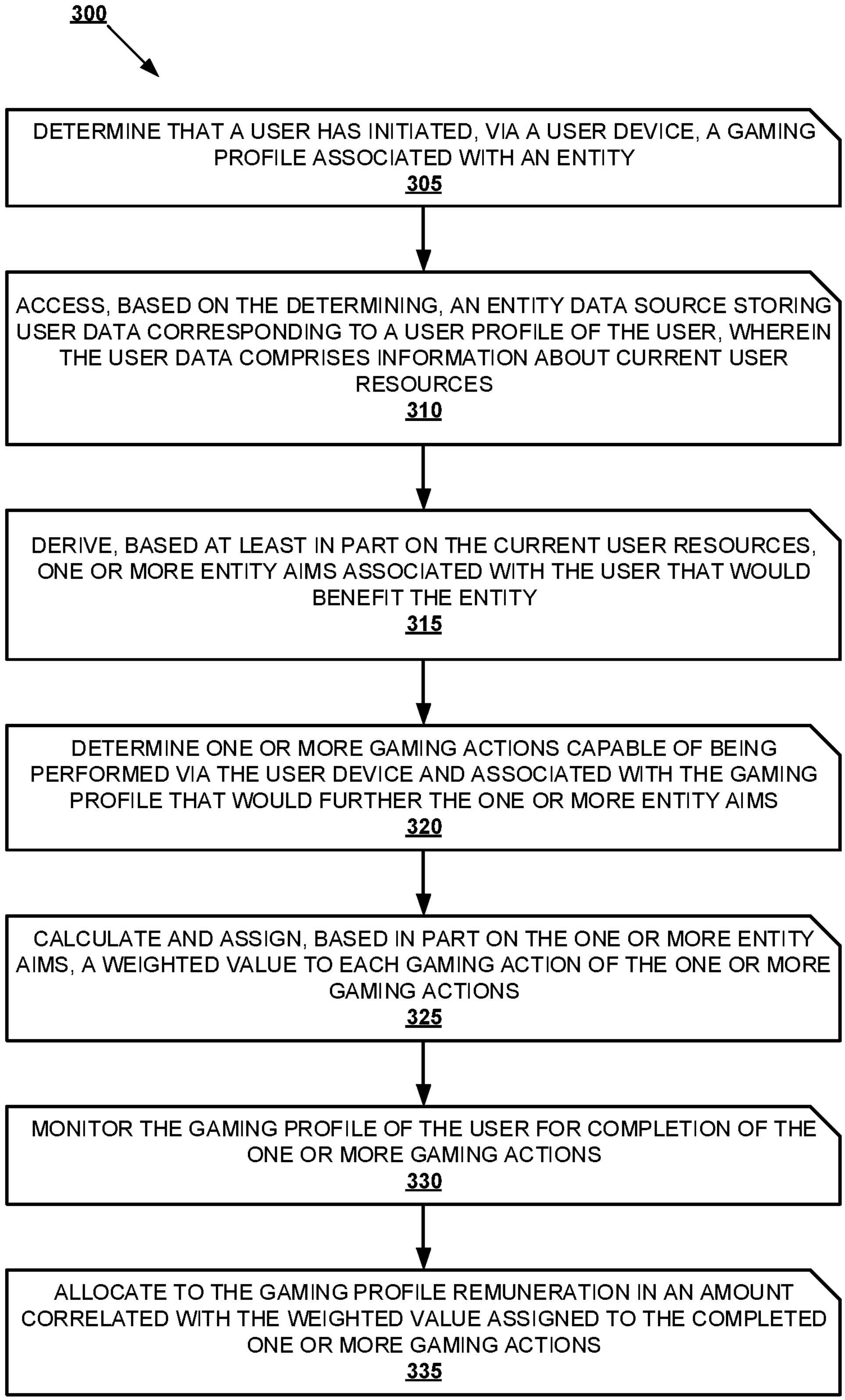
FIG. 3 depicts a block diagram of a method for directing user gaming actions, in accordance with an embodiment of the present invention.

FIG. 3 depicts a block diagram of a method 300 for directing user gaming actions, in accordance with an embodiment of the present invention. The method 300 is performed when a processor executes executable code. At block 305, the processor determines that a user has initiated, via a user device, a gaming profile associated with an entity. For instance, the user may create a new gaming profile/account, or access an existing profile/account, by providing authentication information (e.g., log-in credentials). In some embodiments, the authentication credentials can include facial recognition, fingerprint recognition, etc. Specifically, in some embodiments, the initiating of the gaming profile may include an authentication process, where the authentication process includes verifying authentication data obtained from the user by comparing the authentication data with stored authentication information. When the user has been verified, then the user can access the gaming profile. At block 310, the processor accesses, based on the determining, an entity data source storing user data corresponding to a user profile of the user, where the user data includes information about current user resources. The current user resources may include real-world currency, in-game currency, and/or various other assets. In some embodiments, the entity data source may store information about the user's bank account or other financial information including direct deposit information, recurring payments, subscription information, emergency fund contributions, retirement fund contributions, investments, debt and/or loan information, buying patterns, etc.

At block 315, the processor derives, based at least in part on the current user resources, one or more entity aims associated with the user that would benefit the entity. Entity aims could include increasing an amount that the user keeps in savings, increasing the user's engagement, promoting cross-selling with partner entities, promoting financial learning, loan initiation, and increasing user retention. Cross selling with partner entities could entail an agreement between the entity and a partner entity to promote the partner entity to the entity's users or consumers in exchange for similar promotion from the partner entity. This promotion could include exclusive discounts, package deals, and/or reputable recommendations. Deriving the one or more entity aims may be performed, according to one embodiment, by analyzing a prioritized list of objectives/aims of the entity. In some embodiments, collecting entity data from a plurality of user profiles/accounts, separating the entity data into disparate aspects of the entity's business, and iteratively analyzing the entity data of each of the disparate aspects of the entity's business. Further, one or more of the disparate aspects of the entity's business may then be designated as the one or more entity aims according to a ranking, in which case the processor ranks, in order of value to the entity, each of the disparate aspects of the entity's business. Entity data could include information about user resources and/or financial information regarding the entity's operations. The disparate aspects of the entity's business can be designated as the one or more entity aims according to the value.

At block 320, the processor determines one or more gaming actions capable of being performed via the user device and associated with the gaming profile that would further the one or more entity aims. Example gaming actions may include scrolling through and/or reading an informational article on a certain subject or completing another learning activity provided by the entity, contribute real-world resources such as money to a savings account, 401k, retirement account, emergency fund, or other specific purpose, repeated visits to the gaming application to drive user engagement, purchase products from partner entities so that the entity receives sponsorship payments, loan initiation, and/or various other gaming actions capable of being performed via the user device and associated with the gaming profile.

At block 325, the processor calculates and assigns, based at least in part on the one or more entity aims, a weighted value to each gaming action of the one or more gaming actions. When the entity aims are ranked in order of priority, the one or more gaming actions that correspond to each of the one or more entity aims may be given a weighted value correlating to the importance of the gaming action that corresponds to the entity aim. At block 330, the processor monitors the gaming profile of the user for completion of one or more gaming actions.

When the user has completed the one or more gaming actions, at block 335, the processor allocates to the gaming profile remuneration in an amount correlated with the weighted value assigned to the completed one or more gaming actions. In some embodiments, the remuneration includes an in-game resource that is capable of being exchanged for gameplay access associated with the gaming profile that enables participation in an application game. In some embodiments, the in-game resource may be accumulated and entered into a sweepstakes to obtain a real-world resource such as real-world currency. In some embodiments, the user may be awarded or otherwise allocated the remuneration upon completion of an undisclosed number of actions of the one or more gaming actions.

In some embodiments, the method 300 will also include tracking the user's progress towards one or more entity aims by receiving data from a gaming software application running on the user device. Further, the method 300 may also include initiating displaying, via a user interface of the gaming software application, where the gaming software application is accessible via the user device, the user's progress towards the one or more entity aims. In some embodiments, the method 300 may transmit one or more control signals to the user device to cause the gaming software application running on the user device to provide a daily game, where the daily game allocates the remuneration when the user reaches a threshold within the daily game. In some embodiments, the method 300 can include receiving engagement data from the user device that corresponds to the user's engagement with the daily game, and the method 300 records instances of user engagement with the daily game. The method 300 can determine from the recorded instances that the user engaged with the daily game, where a predefined remuneration amount is associated with each of the instances, and based on the user engaging with the daily game on consecutive days, the method 300 can include increasing the amount of remuneration allocated relative the predefined remuneration amount. Thus, for repeat visitors, there can be a streak component where if the user visits the daily game on consecutive days the remuneration awarded can continually increase to try to encourage or otherwise incentivize users to regularly visit the gaming software application.

Figure 4:
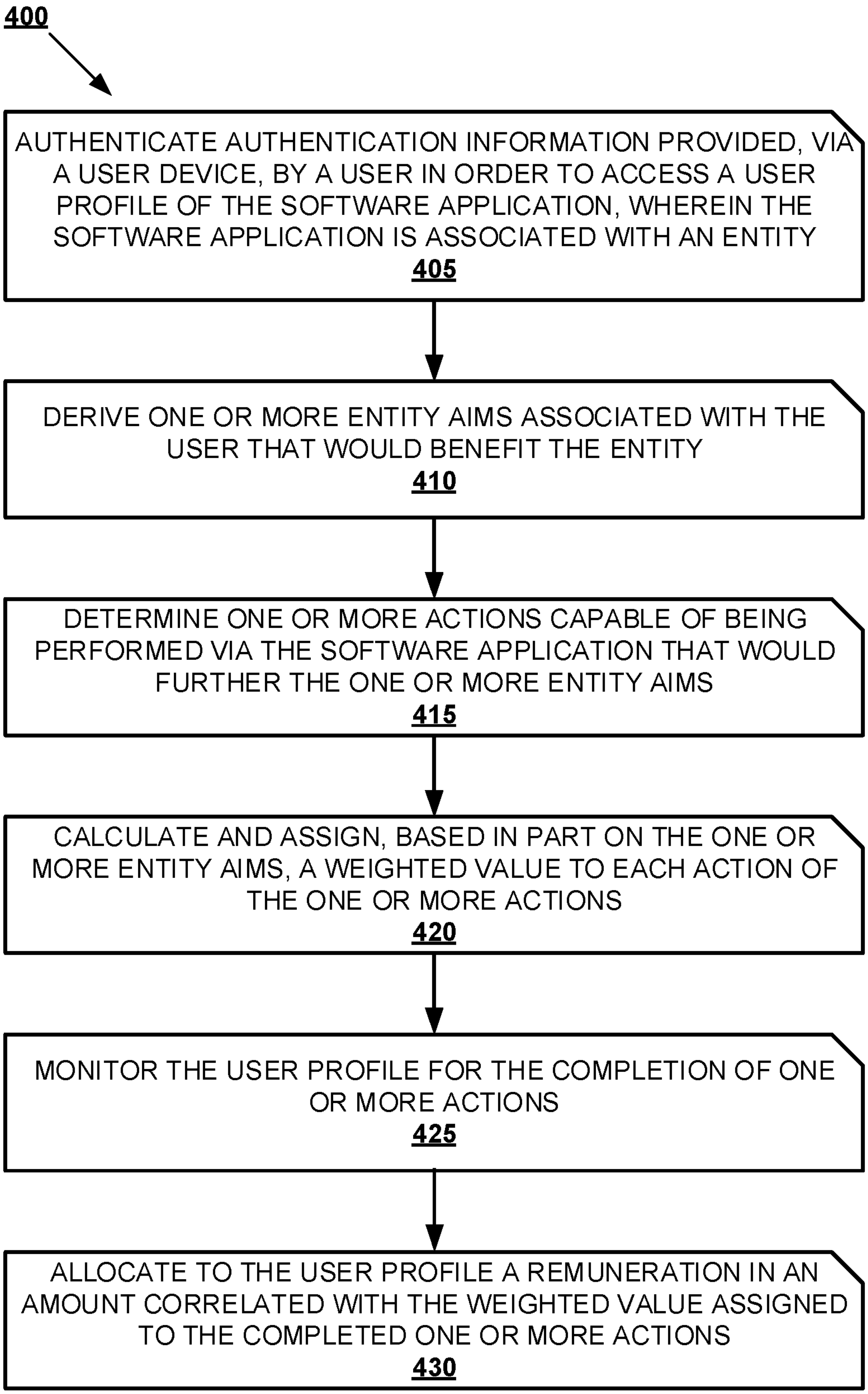
FIG. 4 depicts a block diagram of a method for directing user activity via a software application, in accordance with an embodiment of the present invention.

FIG. 4 depicts a block diagram of a method 400 for directing user activity via a software application, in accordance with an embodiment of the present invention. At block 405, authentication information provided, via a user device, by a user in order to access a user profile of the software application is authenticated by the processor, where the software application is associated with an entity. According to one embodiment, the software application includes a game. At block 410, the processor derives one or more entity aims associated with the user that would benefit the entity. Entity aims could include increasing user savings, increasing user engagement, promoting cross-selling with partner entities, promoting fiscal learning, borrowing facility or loan initiation, and/or increasing user retention. Cross-selling with partner entities could entail an agreement between the entity and a partner entity to promote the other entity to its users or consumers in exchange for similar promotion from the other entity. This promotion could include exclusive discounts, package deals, or reputable recommendations. Deriving the one or more entity aims may be completed based on a prioritized list of aims of the entity. In another example, the one or more entity aims may be derived by using a process that includes collecting entity data from a plurality of user profiles/accounts; separating the entity data into disparate aspects of the entity's business; iteratively analyzing the entity data of each of the disparate aspects of the entity's business; ranking, in order of value to the entity, each of the disparate aspects of the entity's business; and designating one or more of the disparate aspects of the entity's business as the one or more entity aims according to the value. The entity data could include information about user resources or financial information regarding the entity's operations.

At block 415, the processor determines one or more actions capable of being performed via the software application that would further the one or more entity aims. In some embodiments, the actions may include the examples provided above including applying for or being granted a loan, saving money for a specific purpose, and completing a learning activity provided by the entity. At block 420, the processor calculates and assigns, based at least in part on the one or more entity aims, a weighted value to each action of the one or more actions. The priority placed on a given entity aim may be correlated with the weighted value assigned to the one or more actions associated to the given entity aim. At block 425, the processor monitors the user profile for completion of one or more actions. At block 430, the processor allocates to the user profile a remuneration in an amount correlated with the weighted value assigned to the completed one or more actions.

In some embodiments, the remuneration may include an in-game resource such as in-game currency that can be used to pay for or is otherwise exchanged for gameplay access associated with the user profile that enables participation in the game. The application game may supplement the user's current resources upon meeting game criteria. In some embodiments, the user may be allocated or otherwise awarded remuneration based upon completion of an undisclosed number of actions of the one or more actions.

In some embodiments, the method 400 further includes tracking the user's progress towards the one or more entity aims by receiving data from the software application running on the user device. The processor may initiate displaying, via the user interface of the software application accessible via the user device, the user's progress towards the one or more entity aims. In some embodiments, the method 400 also includes transmitting one or more control signals to the user device to cause the software application running on the user device to provide a daily game, where the daily game allocates the remuneration upon the user's reaching of a threshold within the daily game. The method 400 may also include receiving engagement data from the user device corresponding to the user's engagement with the daily game and recording instances of the user engagement with the daily game. The method 400 may further include determining, from the recorded instances, that the user engaged with the daily game, where a predefined remuneration amount is associated with each of the instances. Based on the user engaging with the daily game on consecutive days, the amount of the remuneration allocated may be increased relative the predefined remuneration amount. This embodiment is geared to incentivize users to interact with the software application on a daily basis.

Figure 5:
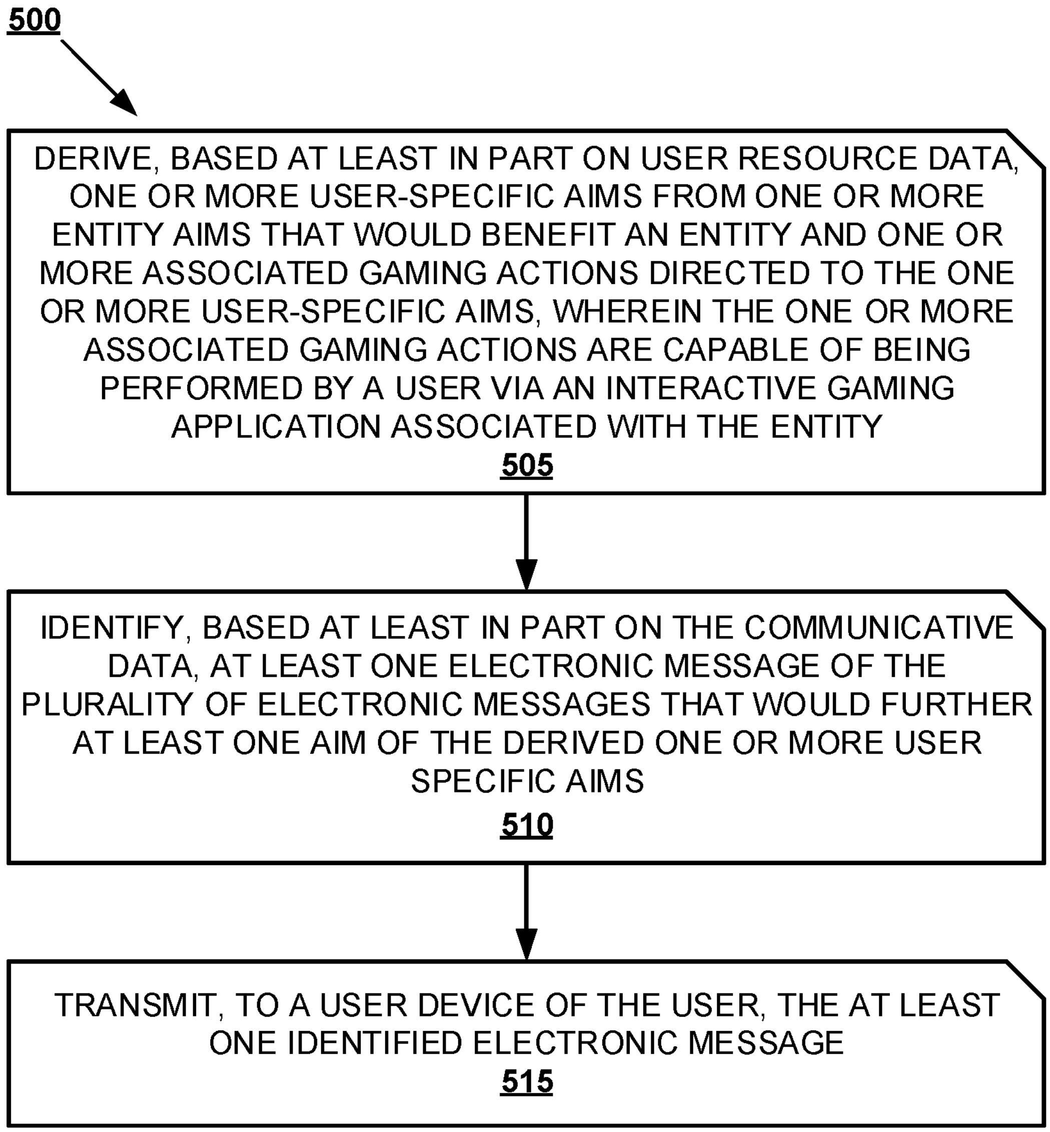
FIG. 5 depicts a block diagram of a method for augmenting gaming engagement, in accordance with an embodiment of the present invention.

FIG. 5 depicts a block diagram of a method 500 for augmenting gaming engagement, in accordance with an embodiment of the present invention. One or more computer stores include communicative data, for each of a plurality of electronic messages, defining a plurality of communicative elements and user resource data, for each of a plurality of users, defining a plurality of variables associated with user resources, the user resources corresponding to the plurality of users. Further, each of the electronic messages is associated with one or more entity aims of an entity and the plurality of users each include one or more accounts that include the user resources. For example, the one or more accounts may include a savings account, a retirement account, an emergency fund account, a checking account, and/or various other accounts related to user finances. In some embodiments, the plurality of variables may be selected from the group consisting of age of the user, the user's income, the user's expenses, the user's living conditions (e.g., renting vs. homeowner), an amount the user keeps in emergency savings, the amount the user has set aside in their retirement savings, the user's buying patterns, the user's earning patterns (e.g., regular or predictable paycheck dates and amounts vs. fluctuating paycheck amounts and dates), and account activity (e.g., activity related to deposits, withdrawals, online or in-store, etc.).

The one or more computer stores are electrically coupled (e.g., through a bus-a physical wire or set of wires) or otherwise in communication with one or more processors (e.g., server processors). At block 505, the system derives, based at least in part on the user resource data, one or more user-specific aims from the one or more entity aims that would benefit the entity. In addition, one or more associated gaming actions directed to the one or more user-specific aims are also derived. The one or more associated gaming actions are capable of being performed by the user via an interactive gaming application associated with the entity. The interactive gaming application may include an online gaming application that is available over the Internet.

According to one embodiment, the entity may include a financial institution and the interactive gaming application may include a plurality of games capable of being played via a user device. The games may include any number of video games, including single-player games. Non-limiting examples of various games can include role-playing games, real-time strategy games, sandbox games, puzzles, action-adventure games, simulation games, sporting games, survival games, shooter games, battle arena games, party games, and platformer games. The one or more associated gaming actions can include in-game actions that the user takes that are associated with real-world, user-specific aims. For example, the user may earn points or tokens by reading through an informational article about the benefits of having an emergency fund and/or depositing real-world currency in an emergency fund. Similarly, the user may earn points or tokens for reading informational material and/or depositing real-world currency in various other financial accounts (e.g., retirement account, savings account, etc.), thereby advancing the one or more entity aims (e.g., increasing money deposited with the entity/financial institution) that are specific to the user. These tasks may be specific to the user based on the user's current financial situation and/or life situation. In some embodiments, the one or more associated gaming actions can include in-game moves that not only further the user's progress within the game but help the user earn points/tokens that can be exchanged in order to enter a sweepstakes for a chance to win real-world currency. Thus, according to various embodiments, the method 500 may include allocating one or more in-game resources that can be entered into a sweepstakes for a chance to win real-world resources that can be deposited to a user account of the one or more accounts specific to the user based, in part, on the user's performance of the one or more associated gaming actions and the odds of the sweepstakes.

In some embodiments, the method 500 also calculates and assigns, based on an importance level derived by the entity, a weighted value to each gaming action of the one or more associated gaming actions. Further, an amount of the one or more in-game resources is allocated based on the assigned weighted value. For example, the entity (e.g., a financial institution) may determine that there is a greater value to the entity if the user uses their real-world currency in a particular manner. Accordingly, the entity may assign more weight to those uses of real-world currency.

At block 510, the system identifies, based at least in part on the communicative data, at least one electronic message of the plurality of electronic messages that would further at least one aim of the derived one or more user specific aims. At block 515, the system transmits, to a user device of the user, the at least one identified electronic message. Advantageously, the identification and transmission process is useful to an entity to distribute electronic messages offering commercial opportunities and is directed to automatically transmitting at least one identified electronic message. In some embodiments, the system generates the plurality of electronic messages that can be transmitted. According to one embodiment, the electronic messages are distributed in response to user inactivity via the interactive gaming application. For instance, if the user fails to sign on to the interactive gaming application for a predetermined duration (e.g., multiple days, a week, etc.) then the at least one identified electronic message may be transmitted. Advantageously, the system addresses a business challenge of retaining and/or otherwise engaging customers/users via the interactive gaming application, which is performed over the Internet. This system is necessarily rooted in computer technology in order to overcome a problem specifically arising in the realm of online gaming applications.

According to various embodiments, the one or more computer stores also include user activity data that may be used to predict a most effective communication channel from the one or more communication channel options. The at least one identified electronic message may be transmitted via the channel predicted to be the most effective communication channel and the process of identifying at least one electronic message is further based at least in part on the predicted most effective communication channel. For example, if it is determined that the user performs a significant amount of their financial transactions through online banking using a mobile application, then the system may determine that a push notification sent via the user's phone might be the most effective form of communication. Alternatively, the user profile of the user may include a mobile telephone number, but the user does not regularly use a mobile application of the financial institution, in which case a SMS text message may be predicted to be a more effective communication channel. Other example communication channels may include email notifications, phone calls, text message, fax, banners, alerts, auditory signals, pop-up notifications, etc.

In some embodiments, at least some of the plurality of communicative elements include visually perceptible elements capable of being depicted via a user interface of the user device of the user. In some examples, at least one element of the visually perceptible elements includes an active link associated with the interactive gaming application that is associated with the entity. For example, the plurality of communication elements may include a visual notification that incentivizes the user to reengage with the interactive gaming application. For example, the visual notification may indicate that the user will receive a reward of in-game resources if the user selects a link and selection of the link directs the user to the interactive gaming application. According to some embodiments, the user may earn one or more in-game resources merely be selecting the link. Thus, one or more in-game resources may be assigned to a user profile of the user for the interactive gaming application, where the one or more in-game resources are configured to be redeemed by the user when the user selects the active link.

According to various embodiments, the system tracks, based on the user resource data, instances in which the user performs the one or more associated gaming actions, where the tracking includes monitoring the user's progress towards the one or more entity aims. Based on the user's progress or performance of the one or more associating gaming actions, the system determines whether one or more additional electronic messages should be transmitted. For example, the system could send follow-up emails to encourage the user to take the next step in their progress within the game so that the user can earn certain resources (e.g., in-game resources or have a chance to win real-world resources). In other examples, the additional electronic messages could advertise promotions, provide educational information about certain benefits the user may obtain by performing the one or more associated gaming actions (e.g., if the user earns a certain amount of points, exchanges those points for real-world currency, and saves the real-world currency to a retirement account they could earn a certain amount in interest over a period of time).

According to various embodiments, the method 500 may also include monitoring user activity of the user, where the user activity includes one or more associated gaming actions. Further, the system may store, based on the monitoring, user activity data of the user to the one or more computer stores. Further, an instance of a user action of the one or more associated gaming actions may be identified and based thereon one or more resources may be allocated to a user profile of the user associated with the interactive gaming application. Further, an amount of the one or more resources that is allocated may correspond to a weighted value assigned to the user action.

Figure 6:
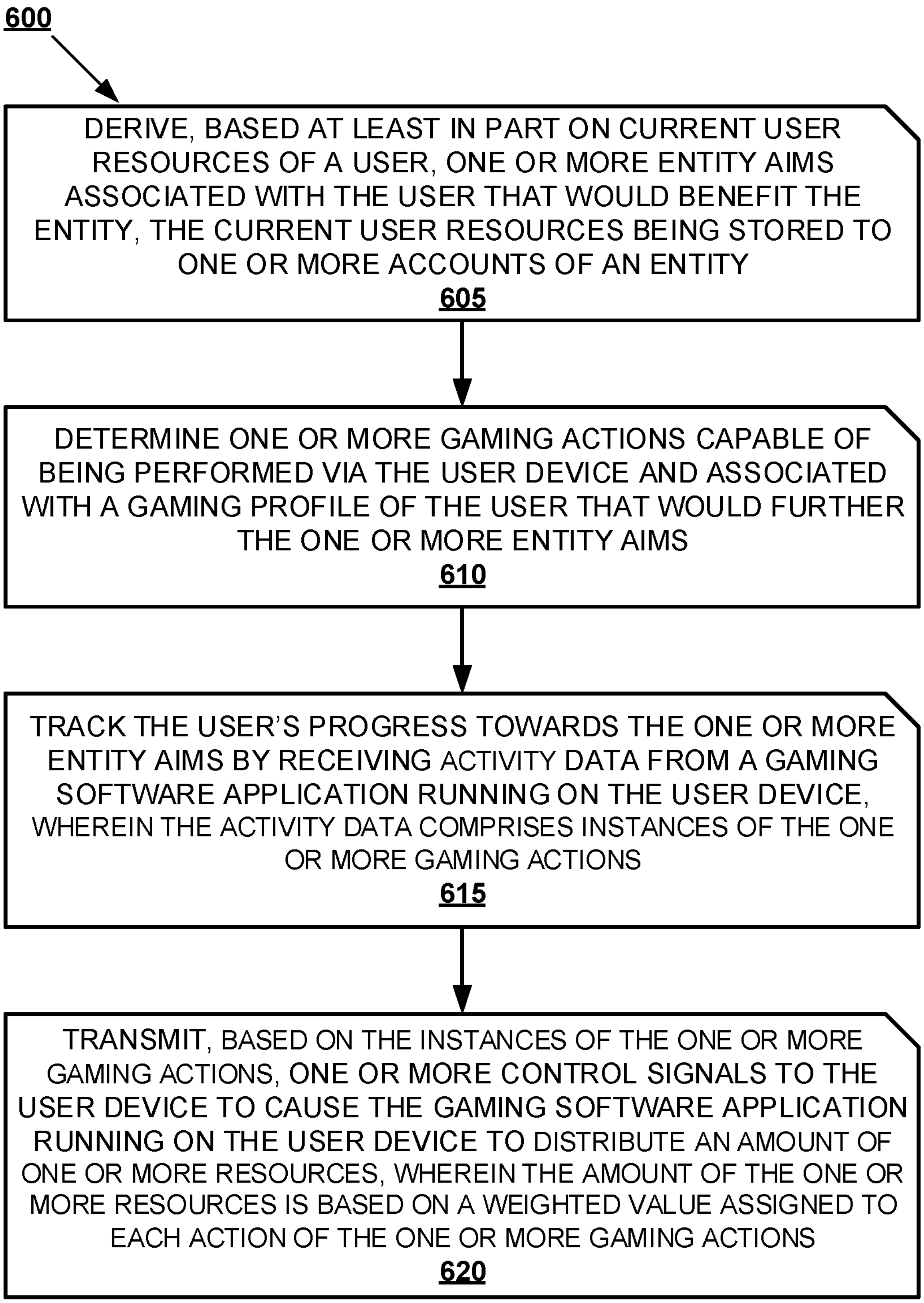
FIG. 6 depicts a block diagram of a method for incentivizing user engagement, in accordance with an embodiment of the present invention.

FIG. 6 depicts a block diagram of a method 600 for incentivizing user engagement, in accordance with an embodiment of the present invention. At block 605, one or more entity aims associated with a user that would benefit an entity, where the current user resources are stored to one or more accounts of the entity. At block 610, the system determines one or more gaming actions that are capable of being performed using the user device via a gaming profile of the user. According to one embodiment, the one or more gaming actions include in-game indications that the user can provide that are configured to further the user's progress in a game playable via the software application. Specifically, the one or more gaming actions may include in-game moves that the user makes in order to advance within a game. At block 615, the system tracks the user's progress towards the one or more entity aims by receiving, and in some cases then analyzing, activity data from a gaming software application running on the user device, where the activity data includes instances of the one or more gaming actions. For example, the system may analyze the type of gaming actions, the frequency of the gaming actions, the timing of the gaming actions, etc.

At block 620, the system transmits, based on the instances of the one or more gaming actions, one or more control signals to the user device to cause the gaming software application running on the user device to distribute an amount of one or more resources, where the amount of the one or more resources is based on a weighted value assigned to each action of the one or more gaming actions. According to one embodiment, the one or more resources may include in-game resources capable of being submitted as part of a promotional drawing (e.g., entered into a sweepstakes) for a chance to win real-world resources, thereby augmenting the current user resources of the user. According to one embodiment, the weighted value may be calculated and assigned based on an importance level derived by the entity, where the weighted value is assigned to each action of the one or more gaming actions.

Figure 7:
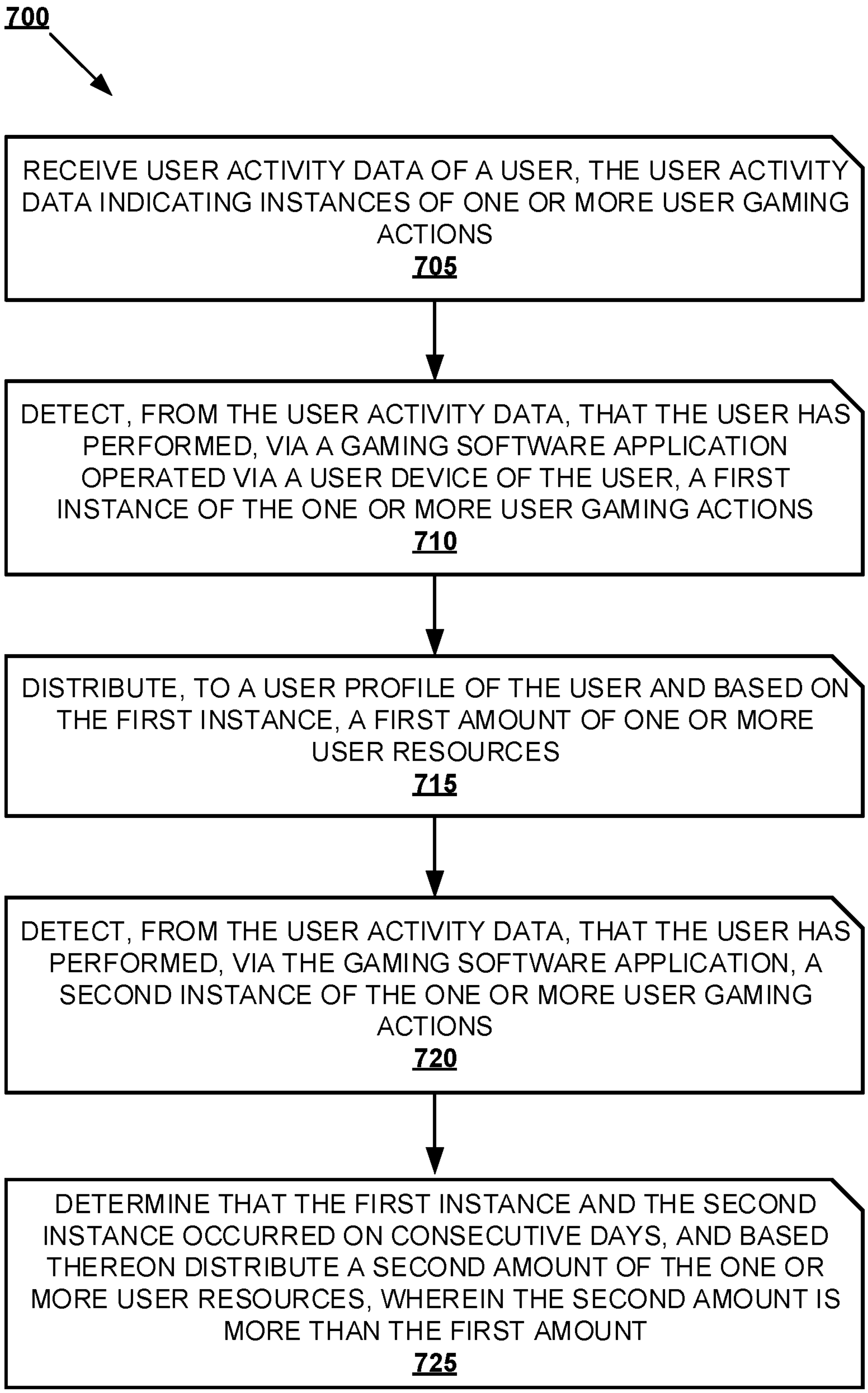
FIG. 7 depicts a block diagram of a method for incentivizing user retention, in accordance with an embodiment of the present invention.

FIG. 7 depicts a block diagram of a method 700 for incentivizing user retention, in accordance with an embodiment of the present invention. At block 705, the system receives user activity data of a user, where the user activity data indicates instances of one or more user gaming actions. According to one embodiment, the one or more gaming actions are associated with one or more entity aims, where the one or more entity aims are determined to provide a benefit to an entity associated with the gaming software application. In some embodiments, the one or more entity aims are derived from user resource data of current user resources of the user.

At block 710, the system detects, from the user activity data, that the user has performed, via a gaming software application operated via a user device of the user, a first instance of the one or more user gaming actions. At block 715, the system distributes, to a user profile of the user and based on the first instance, a first amount of the one or more user resources. At block 720, the system detects, from the user activity data, that the user has performed, via the gaming software application, a second instance of the one or more user gaming actions. Further, at block 725, the system determines that the first instance and the second instance occurred on consecutive days, and based thereon a second amount of the one or more user resources is distributed, where the second amount is more than the first amount. In some embodiments, the system may initiate displaying, via a user interface of the user device, a first visual depiction indicating the user is receiving the first amount of the one or more user resources and a second visual depiction indicating the user is receiving the second amount of the one or more user resources. By indicating that the user receives the user resources for performing the one or more gaming actions, this reinforces continuous user behavior to repeat the one or more gaming actions. In addition, the second visual depiction may indicate that the second amount is more than the first amount because the second instance occurred on the consecutive days. Advantageously, this encourages users to play the game on consecutive days to perform the one or more gaming actions.

According to various embodiments, the method 700 may include transmitting one or more control signals to the user device to cause the gaming software application to provide, via the gaming software application, one or more daily games through which the user can first earn a first daily game amount of the one or more user resources and also a second daily game amount based on playing the one or more daily games for consecutive days, where the second daily game amount is more than the first daily game. For example, there may be a standard amount that is distributed for each instance of play of a daily game, and that number may be increased exponentially based on the user consecutively playing the daily game. In some embodiments, the number may be increased over a set period of days (e.g., a week) and then reset after completion of the set period of days. In some embodiments, the second amount comprises a quantity predicted to incentivize consecutive instances of gameplay by the user.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A gaming system for directing user gaming actions, the system comprising:
- at least one processor;
- a communication interface communicatively coupled to the at least one processor; and
- a memory device storing executable code that, when executed, causes the processor to:
  - determine that a user has initiated, via a user device, a gaming profile associated with an entity;
  - access, based on the determining, an entity data source storing user data corresponding to a user profile of the user, wherein the user data comprises information about current user resources;
  - derive, based at least in part on the current user resources, one or more entity aims associated with the user that would benefit the entity;
  - determine one or more gaming actions capable of being performed via the user device and associated with the gaming profile that would further the one or more entity aims;
  - calculate and assign, based at least in part on the one or more entity aims, a weighted value to each gaming action of the one or more gaming actions;
  - monitor the gaming profile of the user for completion of the one or more gaming actions; and
  - allocate to the gaming profile remuneration in an amount correlated with the weighted value assigned to the completed one or more gaming actions.

2. The system of claim 1, wherein at least one of the one or more entity aims is selected from the group consisting of increasing user savings, increasing user engagement, promoting cross-selling with partner entities, promoting fiscal learning, borrowing facility initiation, and increasing user retention.

3. The system of claim 1, wherein the remuneration comprises an in-game resource that is capable of being exchanged for gameplay access associated with the gaming profile that enables participation in an application game.

4. The system of claim 3, wherein the application game supplements the current user resources upon meeting game criteria, wherein the current user resources comprise a real-world resource.

5. The system of claim 1, wherein the allocating the gaming profile remuneration is based upon completion of an undisclosed number of actions of the one or more gaming actions.

6. The system of claim 1, wherein the code when executed further causes the processor to:
- track the user's progress towards the one or more entity aims by receiving data from a gaming software application running on the user device;
- initiate displaying, via a user interface of the gaming software application, the gaming software application being accessible via the user device, the user's progress towards the one or more entity aims;
- transmit one or more control signals to the user device to cause the gaming software application running on the user device to provide a daily game, the daily game allocating the remuneration upon the user's reaching of a threshold within the daily game;
- receive engagement data from the user device corresponding to the user's engagement with the daily game;
- record instances of user engagement with the daily game; and
- determine from the recorded instances that the user engaged with the daily game, wherein a predefined remuneration amount is associated with each of the instances, and based on the user engaging with the game on consecutive days, increasing the amount of the remuneration allocated relative the predefined remuneration amount.

7. The system of claim 1, wherein the deriving of the one or more entity aims comprises:
- collecting entity data from a plurality of user profiles;
- separating the entity data into disparate aspects of the entity's business;
- iteratively analyzing the entity data of each of the disparate aspects of the entity's business;
- ranking, in order of value to the entity, each of the disparate aspects of the entity's business; and
- designating one or more of the disparate aspects of the entity's business as the one or more entity aims according to the value.

8. The system of claim 1, wherein the initiating the gaming profile comprises an authentication process, wherein the authentication process comprises verifying authentication data obtained from the user with stored authentication information in order for the user to access the gaming profile.

9. A computer system for directing user activity via a software application, the system comprising:
- at least one processor;
- a communication interface communicatively coupled to the at least one processor; and
- a memory device storing executable code that, when executed, causes the processor to:
  - authenticate authentication information provided, via a user device, by a user in order to access a user profile of the software application, wherein the software application is associated with an entity;

derive one or more entity aims associated with the user that would benefit the entity;

determine one or more actions capable of being performed via the software application that would further the one or more entity aims;

calculate and assign, based at least in part on the one or more entity aims, a weighted value to each action of the one or more actions;

monitor the user profile for the completion of one or more actions; and allocate to the user profile a remuneration in an amount correlated with the weighted value assigned to the completed one or more actions.

10. The system of claim 9, wherein at least one of the one or more entity aims is selected from the group consisting of increasing user savings, increasing user engagement, promoting cross-selling with partner entities, promoting fiscal learning, borrowing facility initiation, and increasing user retention.

11. The system of claim 9, wherein the software application comprises a game and the remuneration comprises an in-game resource that is exchanged for gameplay access associated with the user profile that enables participation in the game.

12. The system of claim 9, wherein the allocating the remuneration is based upon completion of an undisclosed number of actions of the one or more actions.

13. The system of claim 9, wherein the code when executed further causes the processor to:

track the user's progress towards the one or more entity aims by receiving data from the software application running on the user device;

initiate displaying, via a user interface of the software application accessible via the user device, the user's progress towards the one or more entity aims;

transmit one or more control signals to the user device to cause the software application running on the user device to provide a daily game, the daily game allocating the remuneration upon the user's reaching of a threshold within the daily game;

receive engagement data from the user device corresponding to the user's engagement with the daily game;

record instances of user engagement with the daily game; and determine from the recorded instances that the user engaged with the daily game, wherein a predefined remuneration amount is associated with each of the instances, and based on the user engaging with the game on consecutive days, increasing the amount of the remuneration allocated relative the predefined remuneration amount.

14. The system of claim 9, wherein the deriving of the one or more entity aims comprises:

collecting entity data from a plurality of user profiles;

separating the entity data into disparate aspects of the entity's business;

iteratively analyzing the entity data of each of the disparate aspects of the entity's business;

ranking, in order of value to the entity, each of the disparate aspects of the entity's business; and designating one or more of the disparate aspects of the entity's business as the one or more entity aims according to the value.

15. A computer-implemented method of directing user activity via a gaming software application, the method comprising:

determining that a user has initiated, via a user device, a gaming profile of the gaming software application associated with an entity;

accessing, based on the determining, an entity data source storing user data corresponding to a user profile of the user, wherein the user data comprises information about current user resources;

deriving, based at least in part on the current user resources, one or more entity aims associated with the user that would benefit the entity;

determining one or more gaming actions capable of being performed via the user device and associated with the gaming profile that would further the one or more entity aims;

calculating and assigning, based at least in part on the one or more entity aims, a weighted value to each gaming action of the one or more gaming actions;

monitoring the gaming profile of the user for completion of the one or more gaming actions; and allocating to the gaming profile remuneration in an amount correlated with the weighted value assigned to the completed one or more gaming actions.

16. The method of claim 15, wherein at least one of the one or more entity aims is selected from the group consisting of increasing user savings, increasing user engagement, promoting cross-selling with partner entities, promoting fiscal learning, borrowing facility initiation, and increasing user retention.

17. The method of claim 15, wherein the remuneration comprises an in-game resource that is capable of being exchanged for gameplay access associated with the gaming profile that enables participation in a game of the gaming software application.

18. The method of claim 17, wherein the game supplements the current user resources upon meeting game criteria, wherein the current user resources comprise a real-world resource.

19. The method of claim 15 further comprising:

tracking the user's progress towards the one or more entity aims by receiving data from the gaming software application running on the user device;

initiating displaying, via a user interface of the gaming software application accessible via the user device, the user's progress towards the one or more entity aims;

transmitting one or more control signals to the user device to cause the gaming software application running on the user device to provide a daily game, the daily game allocating the remuneration upon the user's reaching of a threshold within the daily game;

receiving engagement data from the user device corresponding to the user's engagement with the daily game; and determining from the recorded instances that the user engaged with the daily game, wherein a predefined remuneration amount is associated with each of the instances, and based on the user engaging with the game on consecutive days, increasing the amount of the remuneration allocated relative the predefined remuneration amount.

20. The method of claim 15, wherein the deriving of the one or more entity aims comprises:

collecting entity data from a plurality of user profiles;

separating the entity data into disparate aspects of the entity's business;

iteratively analyzing the entity data of each of the disparate aspects of the entity's business;

ranking, in order of value to the entity, each of the disparate aspects of the entity's business; and designating one or more of the disparate aspects of the entity's business as the one or more entity aims according to the value.

* * * * *